(12) United States Patent
Noguchi et al.

(10) Patent No.: US 8,605,179 B2
(45) Date of Patent: Dec. 10, 2013

(54) IMAGE PICKUP APPARATUS

(75) Inventors: Toshiyuki Noguchi, Tachikawa (JP); Hisashi Goto, Tokyo (JP); Keigo Matsuo, Akiruno (JP)

(73) Assignee: Olympus Corporation, Tokyo (JP)

( * ) Notice: Subject to any disclaimer, the term of this patent is extended or adjusted under 35 U.S.C. 154(b) by 180 days.

(21) Appl. No.: 13/135,865

(22) Filed: Jul. 15, 2011

(65) Prior Publication Data

US 2012/0026372 A1    Feb. 2, 2012

(30) Foreign Application Priority Data

Jul. 27, 2010    (JP) ................. 2010-168335

(51) Int. Cl.
*H04N 3/14* (2006.01)
*H04N 5/335* (2011.01)

(52) U.S. Cl.
USPC .................................................. 348/302

(58) Field of Classification Search
USPC ........ 348/302, 220.1, 345, 241; 354/402, 429
See application file for complete search history.

(56) References Cited

U.S. PATENT DOCUMENTS 5,502,538 A * 3/1996 Ogasawara ............ 396/96
6,829,008 B1 * 12/2004 Saga et al. .............. 348/302

FOREIGN PATENT DOCUMENTS

JP    3592147    9/2004

* cited by examiner

*Primary Examiner* — Roberto Velez
*Assistant Examiner* — Stephen Coleman
(74) *Attorney, Agent, or Firm* — Kenyon & Kenyon LLP

(57) ABSTRACT

An image pickup apparatus in which, a taking lens is installable or fixed, includes an image pickup element in which, pixels having a photoelectric conversion portion are arranged two dimensionally.

The pixels include focal-point detection pixels which are arranged to restrict a direction of incidence of a light beam which is incident, and image-pickup pixels which are arranged such that, the direction of incidence of the light beam which is incident is not restricted more than the direction of incidence restricted by the focal-point detection pixel.

The focal-point detection pixel outputs at least a signal for ranging, and the image-pickup pixel outputs at least a signal for an image.

The image pickup apparatus includes an overflow judging section which judges whether or not the photoelectric conversion portion has overflowed, and a calculating section which calculates an amount of defocus based on a judgment result of the overflow judging section and the signal for ranging.

9 Claims, 19 Drawing Sheets

|  | F01 | F02 | F03 | F04 | F05 | F06 | F07 | F08 | F09 | F10 |
|---|---|---|---|---|---|---|---|---|---|---|
| L01 | G | R | G | R | G | R | G | R | G | R |
| L02 | B | G | B | G | B | G | B | G | B | G |
| L03 | G | R | G | R | G | R | G | R | G | R |
| L04 | B | G | B | G | B | G | B | G | B | G |
| L05 | G | R | G | R | G | R | G | R | G | R |
| L06 | B | G | B | G | B | G | B | G | B | G |
| L07 | G | R | G | R | G | R | G | R | G | R |
| L08 | B | G | B | G | B | G | B | G | B | G |
| L09 | G | R | G | R | G | R | G | R | G | R |
| L10 | B | G | B | G | B | G | B | G | B | G |

IMAGE PICKUP APPARATUS

CROSS-REFERENCE TO RELATED APPLICATION

The present application is based upon and claims the benefit of priority from the prior Japanese Patent Application No. 2010-168335 filed on Jul. 27, 2010; the entire contents of which are incorporated herein by reference.

BACKGROUND OF THE INVENTION

1. Field of the Invention

The present invention relates to an image pickup apparatus.

2. Description of the Related Art

An image pickup apparatus in which, an image pickup element having pixels for detecting focal point (hereinafter, 'focal-point detection pixels') and pixels for picking up image (hereinafter, 'image-pickup pixels') mixed in a pixel row in a predetermined direction is used, has been proposed (Specification of Japanese Patent No. 3592147).

In such image pickup apparatus, it is common to have a photoelectric conversion portion which converts an optical image formed by an image pickup optical system to an electric signal.

When excessive light is incident on the photoelectric conversion portion, there is an overflow, in which an excessive electric charge flows from a pixel to an adjacent pixel. Due to the overflow, a blooming phenomenon which becomes a false signal occurs. As a typical example of a function to prevent the blooming phenomenon, a structure in which, an overflow drain is to be provided has hitherto been known.

SUMMARY OF THE INVENTION

An image pickup apparatus according to the present invention in which, a taking lens is installable or fixed, includes an image pickup element in which, pixels having a photoelectric conversion portion are arranged two-dimensionally, and the pixels include focal-point detection pixels which are arranged to restrict a direction of incidence of a light beam which is incident, and image-pickup pixels which are arranged such that, the direction of incidence of the light beam which is incident is not restricted more than the direction of incidence of the light beam restricted by the focal-point detection pixel, and the focal-point detection pixel outputs at least a signal for ranging, and the image-pickup pixel outputs at least a signal for an image, and the image pickup apparatus includes an overflow judging section which judges whether or not the photoelectric conversion section has overflowed, and a calculating section which calculates an amount of defocus based on a judgment result of the overflow judging section and the signal for ranging.

BRIEF DESCRIPTION OF THE DRAWINGS

FIG. 7 is a plan view showing a structure of an image pickup element according to a first embodiment of the present invention;

FIG. 17 is a plan view showing a structure of an image pickup element according to a third embodiment of the present invention;

FIG. 18 is a plan view showing a structure of an image pickup element according to a fourth embodiment of the present invention.

DETAILED DESCRIPTION OF THE PREFERRED EMBODIMENTS

Exemplary embodiments of an image pickup apparatus according to the present invention will be described below in detail by referring to the accompanying diagrams. However, the present invention is not restricted to the embodiments described below.

(Digital Camera)

Firstly, a camera which includes the image pickup apparatus according to an embodiment of the present invention will be described below.

Figure 1A:
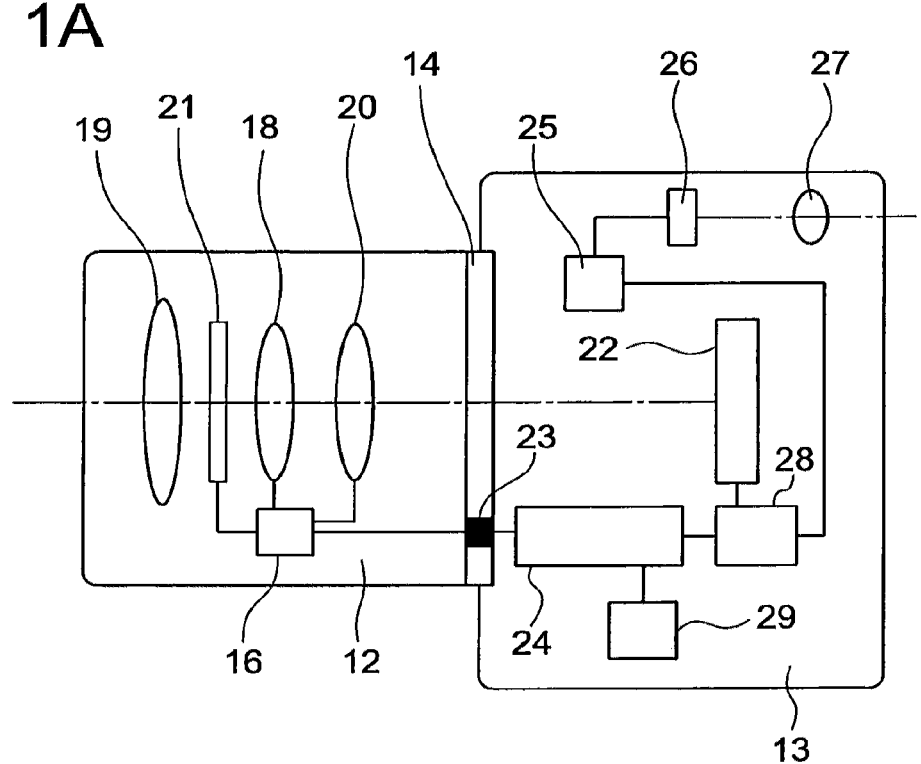
FIG. 1A and FIG. 1B are diagrams showing an internal structure of a digital camera according to an embodiment of the present invention.
Figure 1B:
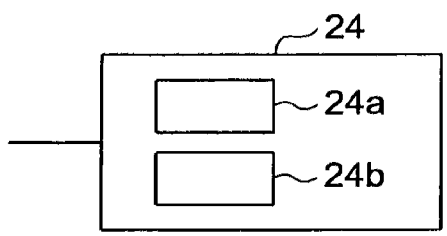

FIG. 1A and FIG. 1B are diagrams showing an internal structure of a digital camera 11 according to the embodiment of the present invention.

The digital camera 11 includes an interchangeable lens 12 and a camera body 13. The interchangeable lens 12 is installed on the camera body 13 by a mounting portion 14.

The interchangeable lens 12 includes a lens drive control unit 16, a zooming lens 18, a lens 19, a focusing lens 20, and a diaphragm 21. The lens drive control unit 16 includes peripheral components such as a micro computer and a memory, and carries out drive control of the focusing lens 20 and the diaphragm 21, state detection of the diaphragm 21, the zooming lens 18, and the focusing lens 20, and transmission of lens information to a body drive control unit 24, and receiving of camera information.

The camera body 13 includes, an image pickup element 22, the body drive control unit 24, a liquid-crystal display element driving circuit 25, a liquid-crystal display element 26, an ocular (eyepiece) 27, and a memory card 29. Pixels which will be described later are arranged two-dimensionally in the image pickup element 22. The image pickup element 22 is disposed on a planned image forming surface, and picks up an image of an object formed by the interchangeable lens 12. Focal-point detection pixels (hereinafter, also called as 'AF pixels') are arranged in rows at predetermined focal point detection positions of the image pickup element 22.

Here, the interchangeable lens 12 corresponds to an image pickup optical system, and the image pickup element 22 corresponds to an image pickup element.

The body drive control unit 24 includes peripheral components such as a micro computer and a memory, and carries out reading of an image signal from the image pickup element 22 via an image pickup element driving circuit 28, correction of the image signal, detection of a focal point adjustment state of the interchangeable lens 12, transmission of camera information (amount of defocus) and reception of lens information from the lens drive control unit 16, and operation control of the overall digital camera. The body drive control unit 24 and the lens drive control unit 16 carry out communication via an electrical contact point 23 of the mounting portion 14, and carry out transfer or reception of various information.

The liquid-crystal display element driving circuit 25 drives the liquid-crystal display element 26 of a liquid-crystal view finder. A photographer observes an image displayed on the liquid-crystal display element 26 via the ocular 27. A memory card 29 is detachable from the camera body 13, and is a portable recording medium which stores and records image signals.

An object image which is formed on the image pickup element 22 upon passing through the interchangeable lens 12 is subjected to photoelectric conversion by the image pickup element 22, and an output thereof is sent to the body drive control unit 24. The body drive control unit 24 calculates an amount of defocus at a predetermined focal point detection position based on an output data (a first image signal and a second image signal) of the AF pixels on the image pickup element 22, and sends the amount of defocus calculated to the lens drive control unit 16. Moreover, the body drive control unit 24 stores an image signal generated based on the output of the image pickup element 22 in the memory card 29 and also sends the image signal to the liquid-crystal display element driving circuit 25, and displays the image on the liquid-crystal display element 26.

Operating members (such as a shutter button and a setting member for setting the focal point detection position) not shown in the diagram are provided on the camera body 13. The body drive control unit 24 detects operating state signals from these operating members, and carries out control of an operation (image pickup operation, operation of setting focal point detection position, and image processing operation) according to a detection result.

The lens drive control unit 16 changes the lens information according to factors such as a focusing state, a zooming state, a diaphragm setting state, and a diaphragm opening F value. Concretely, the lens drive control unit 16 monitors positions of the lens 18 and the focusing lens 20, and a diaphragm position of the diaphragm 21, and computes lens information according to monitor information, or selects the lens information according to the monitor information from a look-up table which has been prepared in advance. The lens drive control unit 16 calculates a lens driving amount based on the amount of defocus which has been received, and drives the focusing lens 20 to a focusing point by a drive source such as a motor which is not shown in the diagram, based on the lens driving amount.

Furthermore, as shown in FIG. 1B, the body drive control unit 24 includes an overflow judging section 24a and a calculating section 24b which calculates the amount of defocus. Details of the overflow judging section 24a and the calculating section 24b will be described later.

(Structure of Image Pickup Element)

The structure of the abovementioned digital camera 11 is same in all the following embodiments. Next, a structure of an image pickup element of an image pickup apparatus in the digital camera 11 will be described below.

Figure 2C:
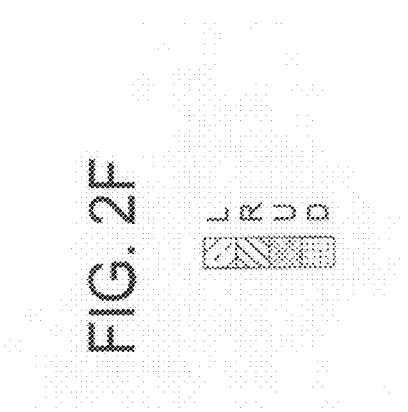
FIG. 2A, FIG. 2B, FIG. 2C, FIG. 2D, and FIG. 2E are diagrams showing a structure of an exit pupil of the digital camera according to the embodiment of the present invention.
Figure 2B:
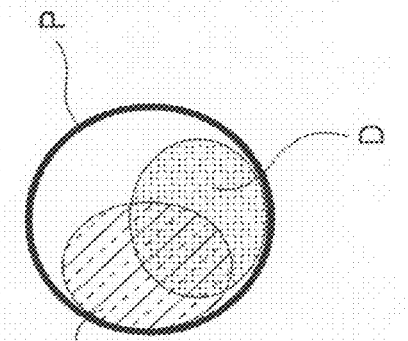
Figure 2A:
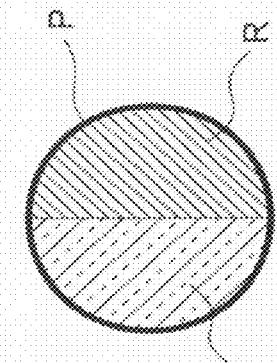
Figure 2F:
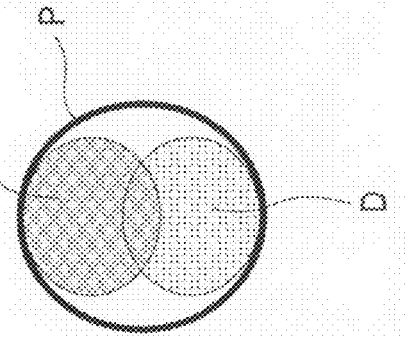
FIG. 2F shows types of oblique lines in FIG. 2A, FIG. 2B, FIG. 2C, FIG. 2D, and FIG. 2E.

FIG. 2A, FIG. 2B, FIG. 2C, FIG. 2D, and FIG. 2E (hereinafter, 'FIG. 2A to FIG. 2E') are diagrams showing a structure of an exit pupil of assumed by the image pickup apparatus according to the embodiment of the present invention. Moreover, FIG. 2F shows types of hatched lines in the FIG. 2A, FIG. 2B, FIG. 2C, FIG. 2D, and FIG. 2E. The image pickup element 22 has focal-point detection pixels corresponding to pupil areas of at least two types from among a left, a right, an upper, and a lower as shown in FIG. 2A to FIG. 2E, of an exit pupil P which the digital camera 11 assumes.

Figure 2E:
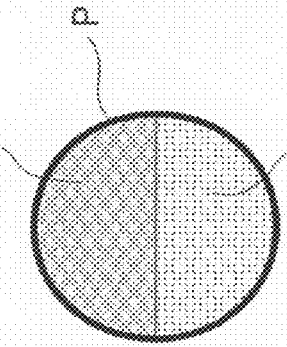
Figure 2D:
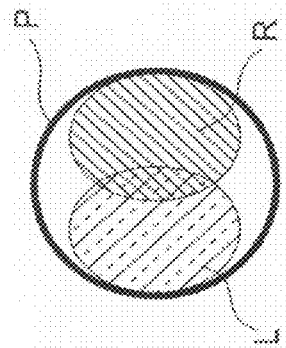

Concrete example is as shown by the following (1) to (5).
(1) The exit pupil P is divided into two vertically, and a left-side pupil detection pixel L and a right-side pupil detection pixel R are disposed (FIG. 2A).
(2) The exit pupil P is divided into two horizontally, and an upper-side pupil detection pixel U and a lower-side pupil detection pixel D are disposed (FIG. 2B).
(3) The left-side pupil detection pixel L and the right-side pupil detection pixel R are disposed horizontally, and are partly overlapped (FIG. 2C).
(4) The upper-side pupil detection pixel U and the lower-side pupil detection pixel D are disposed vertically, and are partly overlapped (FIG. 2D).
(5) The left-side pupil detection pixel L and the lower-side pupil detection pixel D are disposed at arbitrary positions, and are overlapped (FIG. 2E).

A shape of a pupil for ranging is let to be a semicircular shape and an elliptical shape. However, the shape of the pupil for ranging is not restricted to the semicircular shape and the elliptical shape, and can be let to be other shape such as a rectangular shape and a polygonal shape.

Moreover, the vertical and horizontal focal-point detection pixels may be disposed by combining FIG. 2A and FIG. 2B. The vertical and horizontal focal-point detection pixels may be disposed by combining FIG. 2C and FIG. 2D. Furthermore, horizontal and oblique line focal-point detection pixels may be disposed by combining FIG. 2C and FIG. 2E. However, the combinations are not restricted to the above-mentioned combinations.

In the image pickup apparatus according to the embodiment, the pupil has different areas, and a focal point state of a taking lens is detected by detecting a phase difference based on a first image signal which is obtained from an output of a photoelectric conversion portion which receives a light beam passed through one of the areas, and a second image signal which is obtained from an output of a photoelectric conversion portion which receives a light beam passed through one more of the areas.

Concrete examples of division of the pupil will be described below by referring to diagrams from FIG. 3 to FIG. 6.

(Division of Photoelectric Conversion Portion)

Firstly, an example of dividing the exit pupil by dividing a photoelectric conversion portion of the image pickup element 22 will be described below.

Figure 3:
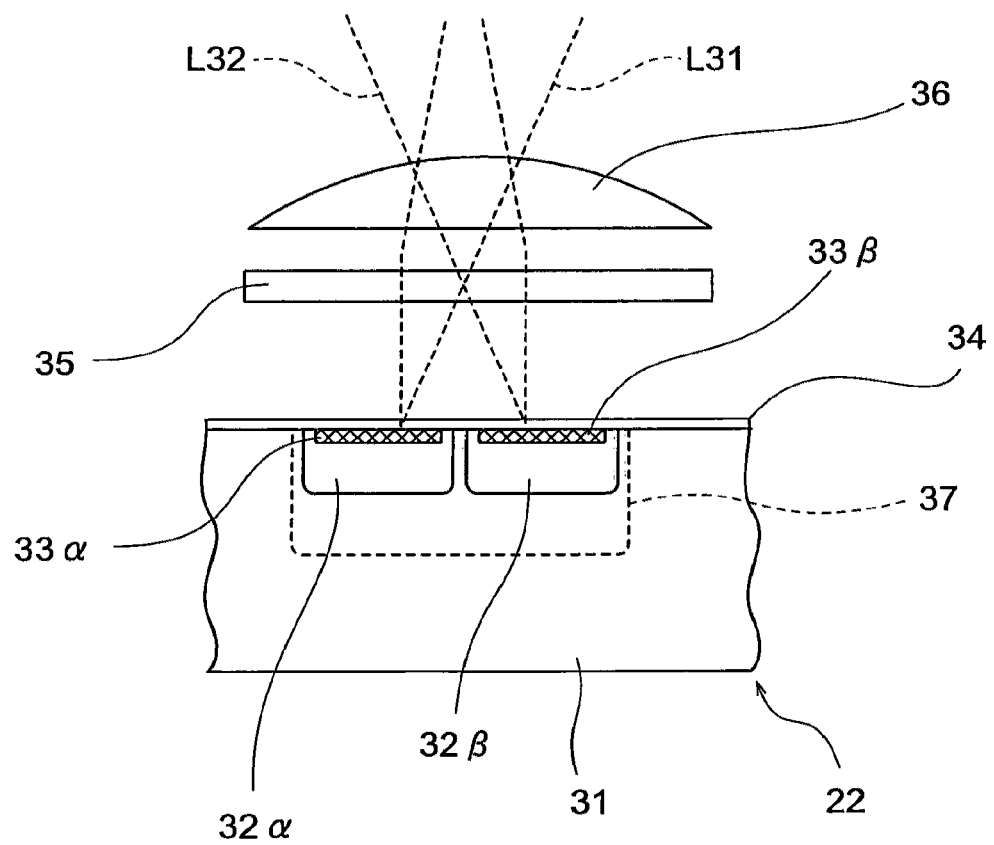
FIG. 3 is a diagram showing a structure of a photoelectric conversion portion of an image pickup element according to the embodiment of the present invention.

FIG. 3 is a diagram showing a structure of the photoelectric conversion portion of the image pickup element 22.

The image pickup element 22 includes a P-well 31 which is formed in a substrate, n-areas 32α and 32β which generate and accumulate a photo-induced charge together with the P-well 31, a floating diffusion portion (hereinafter called as 'FD portion') which transfers the photoelectric charge accumulated in the n-areas 32α and 32β, a surface P+ layers 33α and 33β which collects the photo-induced charge for transferring efficiently the photo-induced charge accumulated in the n-areas 32α and 32β, a transfer gate (not shown in the diagram) for transferring the photo-induced charge to the FD portion, an $SiO_2$ film 34 which is a gate insulating film, a color filter 35 of Bayer arrangement, and a micro lens 36 which collects light from the object.

The micro lens 36 is formed to have a shape and a position such that, a pupil of the interchangeable lens 12 (FIG. 1A and FIG. 1B), and the surface P+ layers 33α and 33β become substantially conjugate. The photo-induced charge, schematically, is generated in an area 37.

In the example shown in FIG. 3, the photoelectric conversion area is divided into the n-area 32α and the surface p+layer 33α, and n-area 32β and the surface p+33β, and the exit pupil is divided accordingly. Light rays L31 and L32 are incident on the n-area 32α and the surface p+33α, and the n-area 32β and the surface p+33β respectively.

(Decentering Aperture Portion)

Next, an example of dividing the exit pupil by decentering an aperture portion of the image pickup element 22 with respect to a center of the photoelectric conversion element will be described below by referring to FIG. 4.

Figure 4:
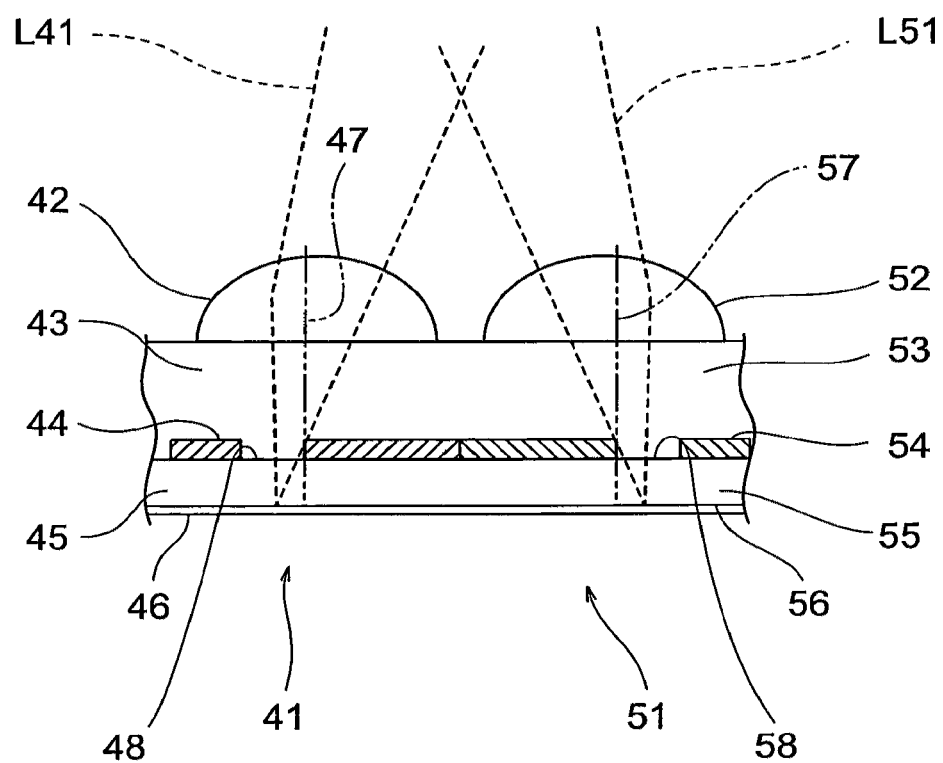
FIG. 4 is a cross-sectional view showing a structure of two adjacent pixels of the image pickup element according to the embodiment of the present invention.

FIG. 4 is a cross-sectional view showing a structure of two adjacent pixels of the image pickup element 22.

A pixel 41 includes a micro lens 42, a smooth layer 43 for forming a plane for forming the micro lens 42, a light shielding film 44 for preventing mixing of colors of color pixels, a smooth layer 45 for making flat a surface for mounting a color filter layer, and a photoelectric conversion element 46, which are disposed in order from the topmost portion. A pixel 51, also similar to the pixel 41, includes a micro lens 52, a smooth layer 53, a light shielding film 54, a smooth layer 55, and a photoelectric conversion element 56, which are disposed in order from the topmost portion.

Furthermore, in the pixels 41 and 51, the light shielding films 44 and 54 have aperture portions 48 and 58 respectively, which are decentered on an outer side from central portions 47 and 57 respectively, of the photoelectric conversion elements 46 and 56.

In the example shown in FIG. 4, an opening portion of a pixel of the image pickup element 22 is decentered with respect to a center of a photoelectric conversion element. Therefore, as light rays L41 and L51 are to be incident on the photoelectric conversion elements 46 and 46, the exit pupil is divided.

Figure 5:
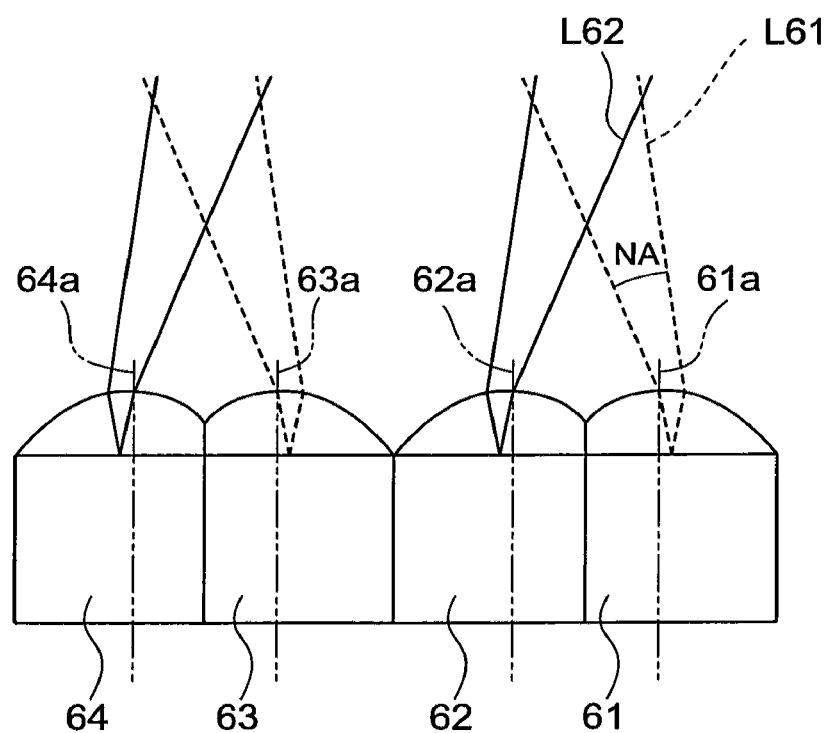
FIG. 5 is a diagram showing an internal structure of the image pickup element according to the embodiment of the present invention.

Next, an example of dividing an exit pupil by decentering a lens will be described below by referring to FIG. 5. FIG. 5 is a diagram showing an internal structure of an image pickup element.

In the image pickup element in FIG. 5, on-chip lenses 61, 62, 63, and 64 on respective pixels are formed independently.

In FIG. 5, optical axes 61a and 63a of the on-chip lenses 61 and 63 respectively of pixels of a pixel set A are shifted to left from centers of the pixels. Moreover, optical axes 62a and 64a of the on-chip lenses 62 and 64 respectively of pixels of a pixel set B are shifted to right from centers of the pixels.

By comparing outputs from the two pixel sets A and B, it is possible to calculate the amount of focus of the lens 18.

In the on-chip lenses 61, 62, 63, and 64, it is possible to control two parameters namely a refractive power and a shape of positions of the optical axes 61a, 62a, 63a, and 64a, independently. When the number of pixels is sufficiently large, the pixel set A and the pixel set B can have a similar intensity distribution of light, and it is possible to carry out phase-difference AF by using this. At this time, since it is possible to detect the amount of defocus on the overall screen, it is possible to acquire three-dimensional information of the object.

In the example shown in FIG. 5, the on-chip lenses of the image pickup element 22 are decentered with respect to the centers of the pixels. Therefore, light rays L61 and L62 are incident on the on-chip lenses 61 and 62 respectively, and accordingly the exit pupil is divided.

Figure 6:
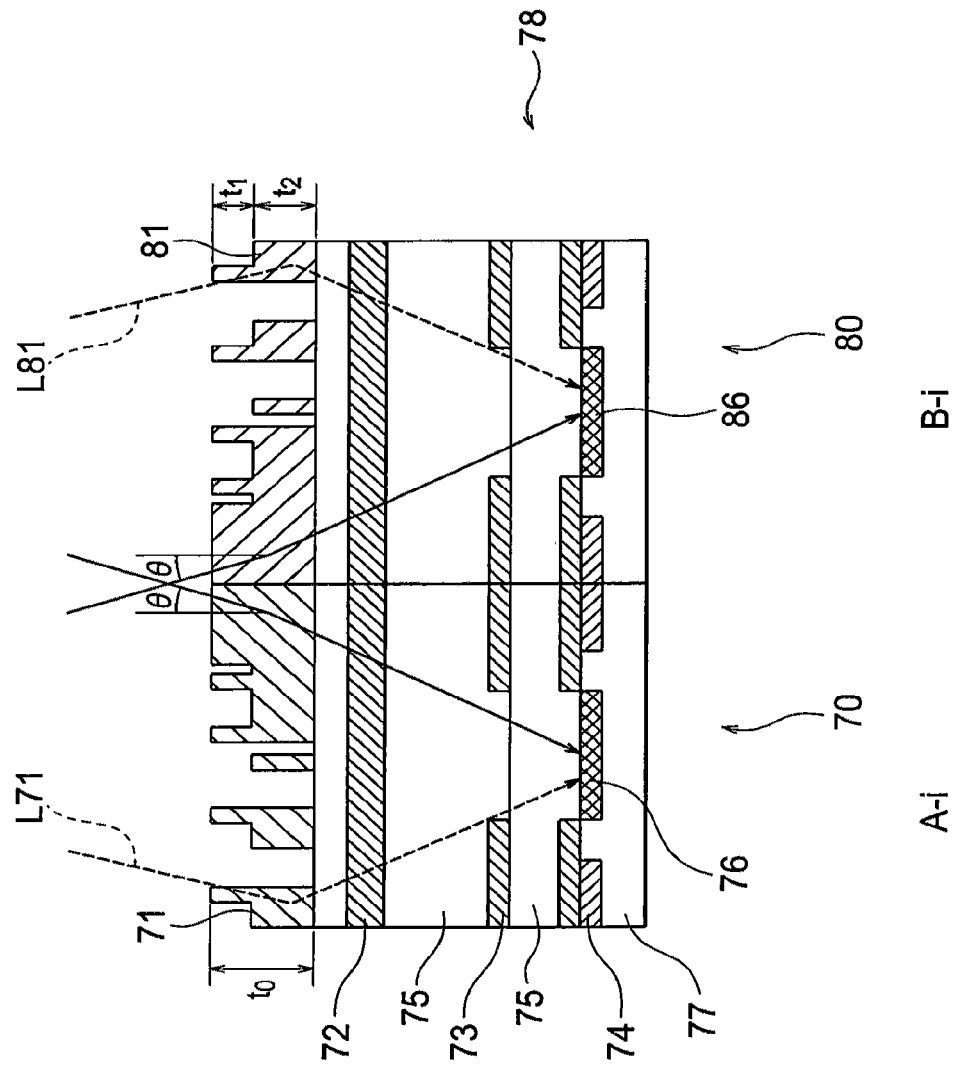
FIG. 6 is a diagram showing an internal structure of the image pickup element according to the embodiment of the present invention.

Next, an example of dividing the exit pupil by using a DML (digital micro lens) will be described below while referring to FIG. 6. FIG. 6 is a cross-sectional view showing an internal structure of an image pickup element.

In the image pickup element shown in FIG. 6, the on-chip lens includes a DML. Pixels 70 and 80 are adjacent pixels which receive light beams from different areas respectively.

In FIG. 6, the image pickup element includes DMLs 71 and 81, a color filter 72, an aluminum wire 73, a signal transmission portion 74, a flattening layer 75, light receiving elements 76 and 86 (such as Si photodiodes), and an Si substrate 77. As shown in FIG. 6, the aluminum wire 73, the signal transmission portion 74, the flattening layer 75, the light receiving elements 76 and 86, and the Si substrate 77 form a semiconductor integrated circuit 78. Here, a structure of the pixel 70 and the pixel 80 is similar except for distributed refractive index lenses 71 and 81.

FIG. 6 shows light beams which are incident on the light receiving elements 76 and 86 respectively. By using the distributed refractive index lenses 71 and 81, light beams L71 and L81 are incident on the light receiving element 76 of the pixel 70 and the light receiving element 86 of the pixel 80 respectively, and accordingly, the exit pupil is divided.

(Embodiments)

Next, embodiments from a first embodiment to a fourth embodiment of an image pickup element according to the present invention will be described below while referring to diagrams from FIG. 7 to FIG. 19.

As an image pickup element (imager) it is possible to use elements such as a CCD (charge coupled device), a CMOS (complementary metal oxide semiconductor), a back-illuminated CMOS, and a sensor (Forveon X3) in which, all of R (red), G (green), and B (blue) colors can be taken in three layers in one pixel.

In the following embodiments, focal-point detection pixels are arranged to receive light beams which have passed through different positions of a pupil of a taking lens by decentering an on-chip lens formed on a taking lens side of a photoelectric conversion portion, from a center of a pixel. As a means for dividing the pupil, a means in which an aperture portion is decentered by using a light shielding member with respect to a pixel center as mentioned above, a means such as the DML, and a means in which, two photoelectric conversion portions are provided in one pixel may be used.

The focal-point detection pixels are arranged to receive light beams which have passed through different positions of the pupil of the taking lens. Therefore, there is a possibility that a signal level from the focal-point detection pixels differs from a signal level which is output from image-pickup pixels near the focal-point detection pixels. For achieving a signal for an image at a position of the focal-point detection pixel, it is preferable to adopt either (1) or (2) below.

(1) A gain is adjusted such that a signal of the focal-point detection pixel becomes same as a signal level of the surrounding image-pickup pixel, and is let to be a signal for image at a position of the focal-point detection pixel.

(2) Pixel interpolation is carried out based on the signal of the focal-point detection pixel and the signal of the image-pickup pixel near the focal-point detection pixel, and let to be a signal for image at a position of the focal-point detection pixel.

A method for adjusting gain is carried out as follows.

Firstly, a signal level as it is when output from the focal-point detection pixel and a signal level as it is when output from the image-pickup pixel near the focal-point detection pixel are compared. Next, the gain is adjusted to bring the signal level output from the focal-point detection pixel close to the signal level output from the image-pickup pixel near the focal-point detection pixel. Thereafter, the signal which is achieved by adjusting the gain of the signal of the focal-point detection pixel is let to be the image signal, and the final image is achieved.

As a method for pixel interpolation, one of (a), (b), and (c) (hereinafter, '(a) to (c)') given below is preferable. However, the method for pixel interpolation is not restricted to (a) to (c), and may be obtained not only by computing simple arithmetic average (including weighted), but also by linear interpolation, interpolation by polynomial of higher than second order, and median.

(a) A signal at a position of the focal-point detection pixel is interpolated based on a signal of the image-pickup pixel near the focal-point detection pixel, and a signal achieved by interpolation is let to be an image signal of the position of the focal-point detection pixel, and the final image is achieved.

(b) The signal at the position of the focal-point detection pixel is interpolated based on the signal of the focal-point detection pixel and the signal of the image-pickup pixel near the focal-point detection pixel, and a signal which is achieved by interpolation is let to be an image signal of the position of the focal-point detection pixel, and the final image is achieved.

(c) The signal at the position of the image for focal point detection is interpolated based on the signal of image-pickup pixel near the focal-point detection pixel, and is interpolated based on signal which is achieved by interpolation and the signal of the position of the focal-point detection pixel, and a signal which is achieved by interpolation is let to be an image signal of the position of the focal-point detection pixel, and the final image is achieved.

A plurality of color filters is disposed for the plurality of pixels respectively of the image pickup element. In a third embodiment and a fourth embodiment which will be described later, transmission characteristics of the plurality of color filters are let to be R (red), G (green), and B (blue).

Filter B is a color filter having transmission characteristics of the shortest wavelength side from among different transmission characteristics of R, G, and B. Filter R is a color filter having transmission characteristics of the longest wavelength side. Filter G is a color filter having transmission characteristics other than the transmission characteristics of the filter B and the filter R.

The plurality of color filters may include a part of a visible region, and has at least three types of different transmission characteristics, or may be some other combination.

The focal-point detection pixels use the filter G as a color filter which gives maximum weight to a brightness signal from among the plurality of color filters, and controls a direction of incidence of a light beam which is incident.

The focal-point detection pixels can also be arranged such that at least some of pixels in which, the color filter which gives the maximum weight to the brightness signal from among the plurality of color filters or a color filter with the maximum transmissivity is disposed, controls the direction of incidence of a light beam which is incident.

As it has been described above, the focal-point detection pixels are arranged to form at least a part of the plurality of pixels, and to control the direction of incidence of a light beam which is incident on the pixel.

Moreover, the focal-point detection pixel outputs at least a signal for ranging. Furthermore, the image-pickup pixel outputs at least a signal for image.

Figure 7:
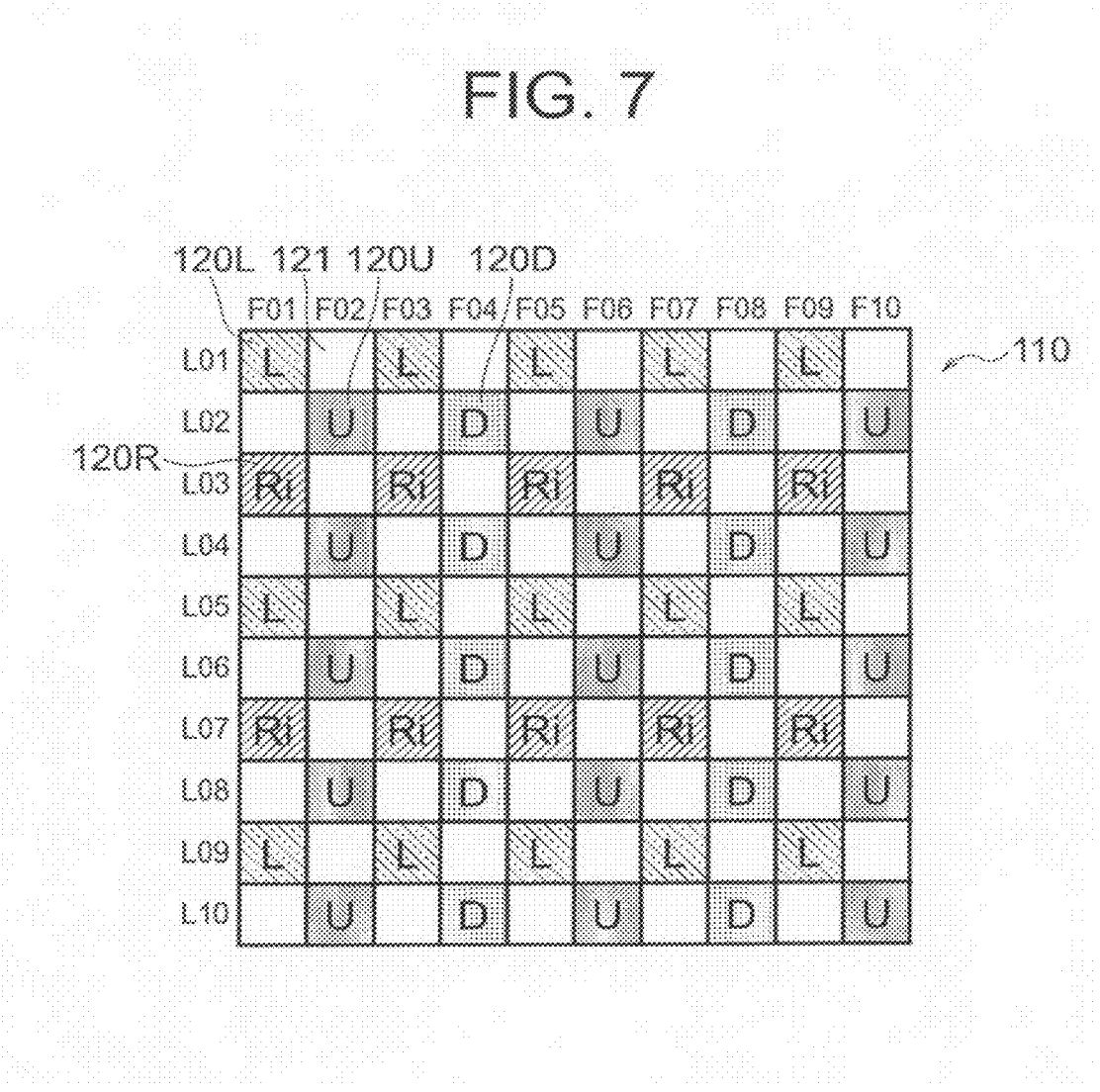

FIG. 7 is a plan view showing conceptually a pixel arrangement in an imager according to a first embodiment of the present invention.

The imager (image pickup apparatus) shown in FIG. 7, is formed by a combination of pixels shown in FIG. 1A, FIG. 1B, FIG. 2A to FIG. 2E, FIG. 3, and FIG. 4, with a center of each pixel and a center of a pupil of each photoelectric conversion area, or a center of gravity of area shifted in an upward direction, a downward direction, a rightward direction, and a leftward direction.

FIG. 7 is a diagram in which, the photoelectric conversion area when each pixel is viewed from an optical axial direction is shown.

In FIG. 7, an example of 10 vertical pixels (L01 to L10) and 10 horizontal pixels (F01 to F10), a total of 100 pixels is shown. However, the number of pixels is not restricted to 100, and it may be an example in which, the number of pixels is more than 10 million.

In the example shown in FIG. 7, directions in which the center of gravity of area of the photoelectric conversion area is shifted with respect to the pixel center are four directions namely, a rightward direction, a leftward direction, an upward direction, and a downward direction. In the following description, the pixels will be called as a right pixel 120R, a left pixel 120L, an upper pixel 120U, and a lower pixel 120D. A pixel 104L and a pixel 114L in FIG. 2 correspond to the left pixel 120L, and a pixel 104R and a pixel 114R in FIG. 2 correspond to the right pixel 120R.

In FIG. 7, in a row of L01, the left pixel 120L, an image-pickup pixel 121, the left pixel 120L, and the image-pickup pixel 121 are disposed repeatedly in order from left (from F01).

In a row of L02, the image-pickup pixel 121, the upper pixel 120U, the image-pickup pixel 121, and the lower pixel 120D are disposed repeatedly in order from left.

In a row of L03, the right pixel 120R, the image-pickup pixel 121, the right pixel 120R, and the image-pickup pixel 121 are disposed repeatedly in order from left.

In a row of L04, the image-pickup pixel 121, the upper pixel 120U, the image-pickup pixel 121, and the lower pixel 120D are disposed repeatedly in order from left.

In rows from L05 onward, an arrangement is such that the pattern of the L01, L02, L03, and L04 is repeated.

When the arrangement in FIG. 7 is seen from columns F01 to F16, the observation is as follows.

In a column of F01, the left pixel 120L, the image-pickup pixel 121, the right pixel 120R, and the image-pickup pixel 121 are disposed repeatedly in order from top (from L01).

In a column of F02, the image-pickup pixel 121, the upper pixel 120U, the image-pickup pixel 121, and the upper pixel 120U are disposed repeatedly in order from top.

In columns from a column F03 onward, the pattern of F01 and F02 is disposed repeatedly.

In the following description, at the time of indicating a specific pixel, that specific pixel will be expressed by a row number followed by a column number. For instance, in the row of L01, a pixel corresponding to the column of F01 will be expressed as 'L01 F01'.

In the example shown in FIG. 7, for instance, an arrangement is such that, for the pixel L01 F01 (left pixel 120L) and any one of pixels L02 F02 (upper pixel 120U), L03 F01 (right pixel 120R), and L02 F04 (lower pixel 120D), a distance between centers of pupils of the pixels or a distance between centers of gravity of the pixels is smaller than a distance between pixel centers which is to be calculated from a pixel pitch.

In the image pickup apparatus according to the first embodiment, it is possible to adjust focus of the optical system by calculating phase-difference information from an output signal (a signal for ranging) from each of a cell group formed by the left pixels 120L and another cell group formed by right pixels 120R.

For example, by comparing an output waveform acquired from pixels L01 F01, L01 F03, L01 F05, L01 F07, and L01 F09 which are left pixels 120L in the row of L01 and an output waveform acquired from pixels L03 F01, L03 F03, L03 F05, L03 F07, and 03 F09 which are right pixels 120R in the row of L03, it is possible to acquire focal point position information and defocus information from a so-called phase-difference detection formula.

(Overflow Process)

Next, a detection of overflow of an electric charge from the focal-point detection pixel, and a process thereof in the first embodiment will be described below.

As it has been mentioned above, when strong light is incident on the focal-point detection pixel resulting in overflow, a focal point detection performance is degraded. Therefore, in the first embodiment, the overflow process is carried out by the following procedure.

Figure 8:
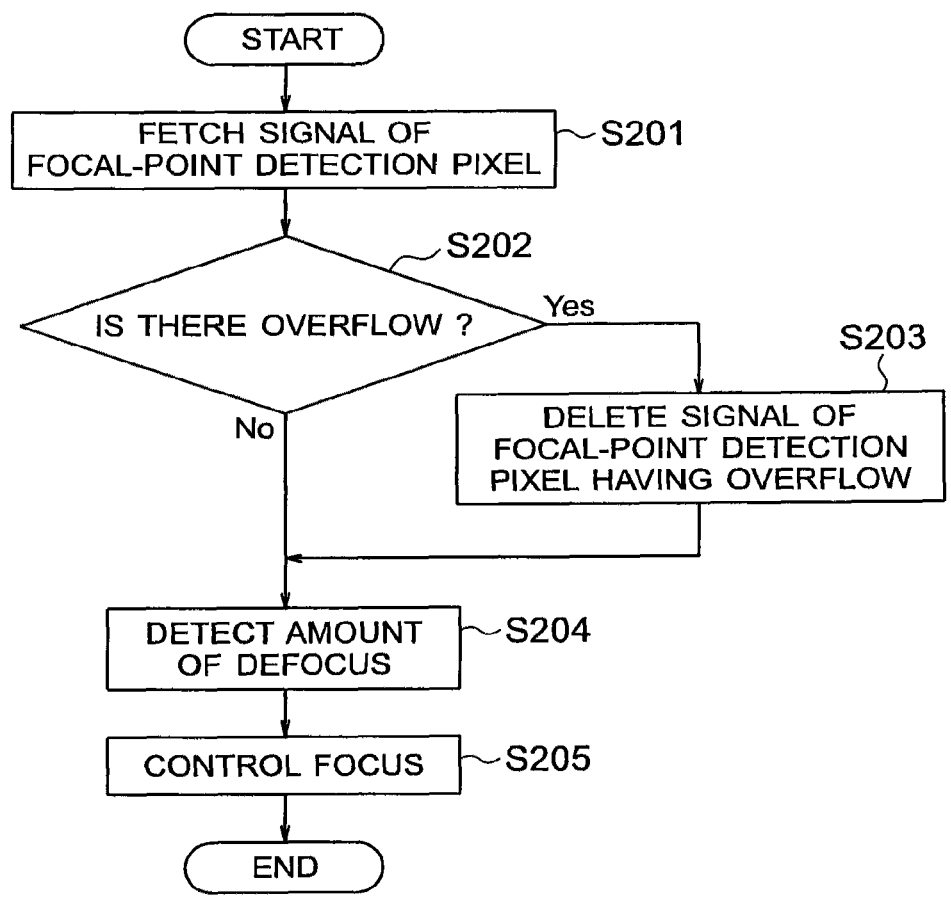
FIG. 8 is a flowchart showing a brief procedure of an overflow process.

FIG. 8 is a flowchart showing a rough procedure for the overflow process. A detail procedure will be described later after describing the flowchart.

At step S201, the overflow judging section 24a fetches a signal from the focal-point detection pixel. At step S202, the overflow judging section 24a makes a judgment of whether or not there is an overflow of electric charge in the focal-point detection pixel from which the signal has been fetched.

When a judgment result at step S202 is affirmative (Yes) with the judgment made that there has been overflow, the signal from the focal-point detection pixel is deleted, or in other words, a signal strength is let to be 0 (signal strength=0).

When the judgment result at step S202 is negative (No), at step S204, the calculating section 24b calculates an amount of defocus based on the judgment result of the overflow judging section 24a.

At step S205, the lens drive control unit 16 drives the focusing lens 20 in the optical axial direction, according to a signal from the calculating section 24b. Accordingly, it is possible to carry out focusing.

(Functional Block Diagram)

Next, a concrete arrangement for carrying out the overflow process will be described below.

Figure 9:
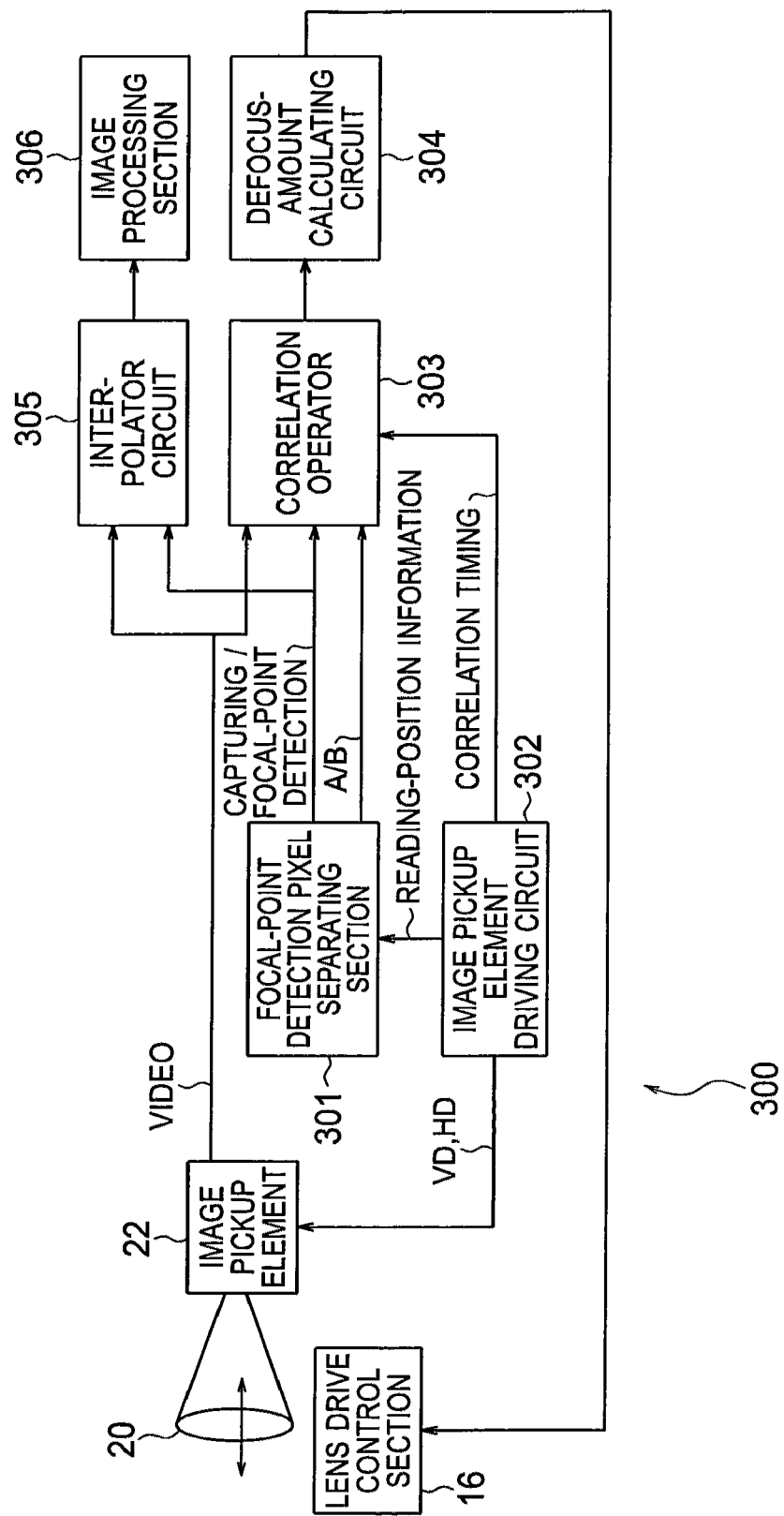
FIG. 9 is a functional block diagram showing a structure of a digital camera.

FIG. 9 is a functional block diagram showing a structure 300 of the digital camera 11.

The lens drive control section 16 drives the focusing lens 20. An image pickup element driving circuit 302 generates synchronization signals HD (horizontal drive signal) and VD (vertical drive signal) for driving the image pickup element, and outputs to the image pickup element 22.

Moreover, the image pickup element driving circuit 302 outputs address information which is reading-position information, to a focal-point detection pixel separating section 301.

The image pickup element 22 picks up an object image. The focal-point detection pixel separating section 301 outputs to a correlation operator 303, a signal for identifying whether the signal is a signal from the image pickup pixel or a signal from the focal-point detection pixel or a signal from an A-pupil pixel or a signal from a B-pupil pixel.

Here, an A-pupil and a B-pupil indicate any two pupils from among the abovementioned four pupils namely, the right pupil, the left pupil, the upper pupil, and the lower pupil.

Moreover, the image pickup element 22 outputs to the correlation operator 303, a video signal (VIDEO) which includes a picture signal, a signal from the A-pupil pixel, and a signal from the B-pupil pixel.

Moreover, when the signal from the focal-point detection pixel separating section 301 is a signal of the focal-point detection pixel, the following interpolation process is carried out according to the requirement.

Figure 11A:
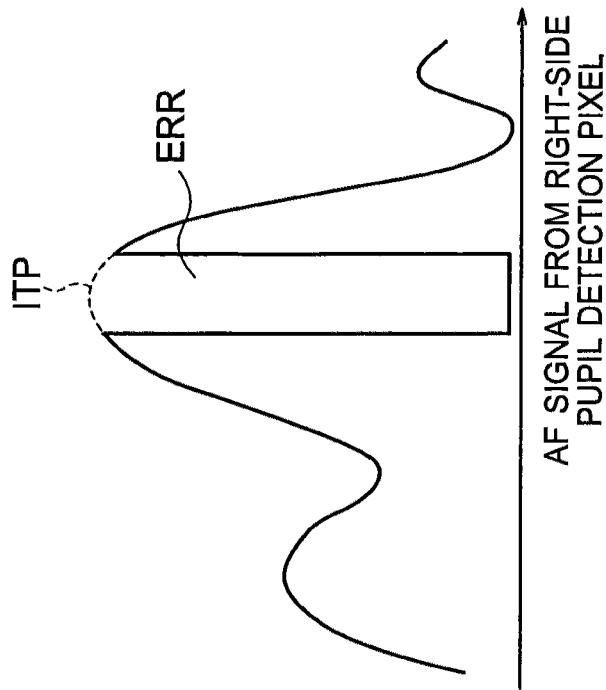
FIG. 11A and FIG. 11B are diagrams describing contents of an interpolation process.
Figure 11B:
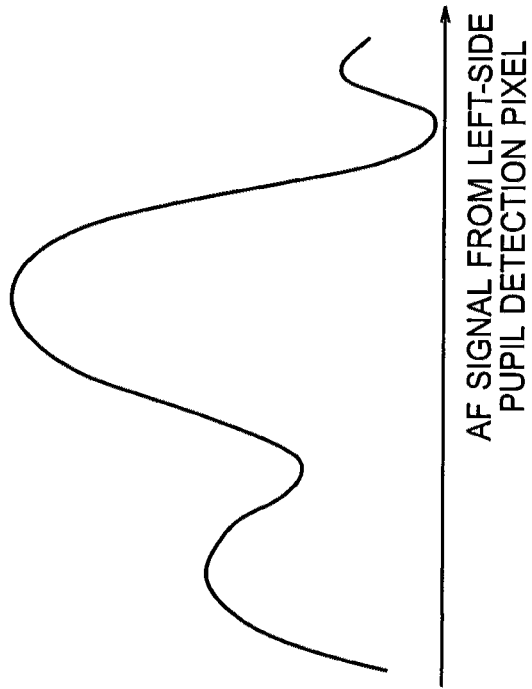

FIG. 11A and FIG. 11B are diagrams describing contents of the interpolation process. FIG. 11A indicates an AF signal from the left-side pupil focal point detection pixel, and FIG. 11B indicates an AF signal from the right-side pupil focal point detection pixel.

As shown in FIG. 11A, there is no fluctuation due to a signal error in the AF signal by the left-side pupil focal-point detection pixel. Whereas, there is a fluctuation ERR due to the signal error in the AF signal by the right-side pupil focal-point detection pixel as shown in FIG. 11B.

In this case, an interpolator circuit 305 interpolates a portion having the fluctuation ERR in the AF signal from the right-side pupil focal-point detection pixel, as a portion ITP shown by a dotted line. For interpolation process, any one of a mathematical interpolation and a pixel interpolation can be used.

Here, 'pixel interpolation' means interpolating an AF signal from the pixel in which there is an error, by using an AF signal from a pixel which is around the pixel in which there is the fluctuation ERR due to the signal error.

The description will be continued upon coming back to FIG. 9. The AF signal which has been interpolated according to the requirement is output to an image processing section 306 by the interpolator circuit 305. The image processing section 306 carries out interpolation process for the AF signal.

Moreover, a defocus-amount calculating circuit 304 calculates the amount of defocus based on the AF signal from the correlation operator 303. The lens drive control section 16 drives the focusing lens 20 based on the amount of defocus which has been calculated.

Next, a function of the correlation operator 303 will be described below in further detail.

Figure 10:
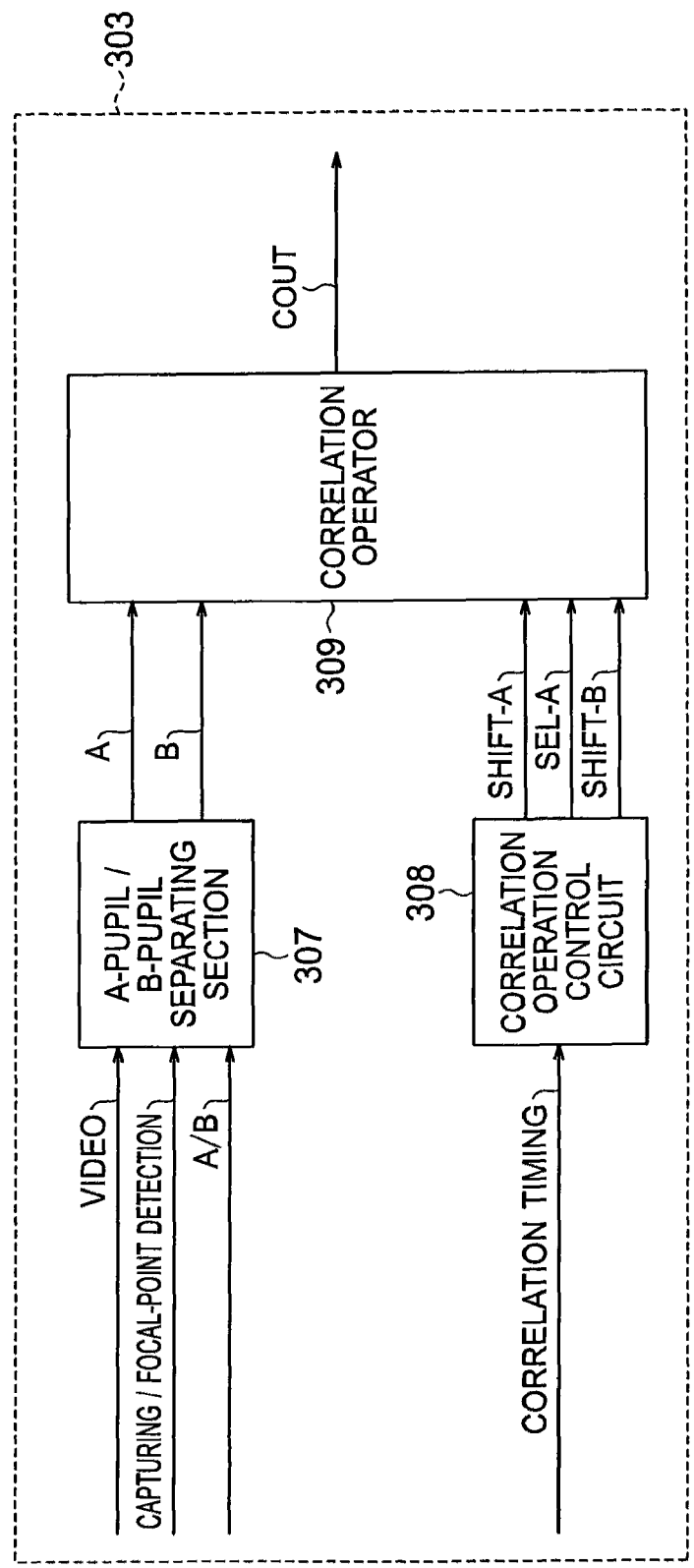
FIG. 10 is a functional block diagram showing a structure of a correlation operator.

FIG. 10 is a functional block diagram showing a structure of the correlation operator 303. A video signal (a signal from the image-pickup pixel and a signal from the focal-point detection pixel), a signal for identifying whether it is a signal from any one of the image-pickup pixel and the focal-point detection pixel, and a signal for identifying whether it is a signal from the A-pupil or a signal from the B-pupil from among the focal-point detection pixels are input to an A-pupil/B-pupil separating section 307.

A signal A from the focal-point detection pixel looking at the A-pupil and a signal B from the focal-point detection pixel looking at the B-pupil are input from the A-pupil/B-pupil separating section 307 to a correlation operator 309.

Moreover, a command SHIFT-A for reading the signal from the A-pupil focal-point detection pixel and a command SHIFT-B for reading the signal from the B-pupil focal-point detection pixel is transmitted from a correlation operation control circuit 308 to the correlation operator 309.

Figure 12:
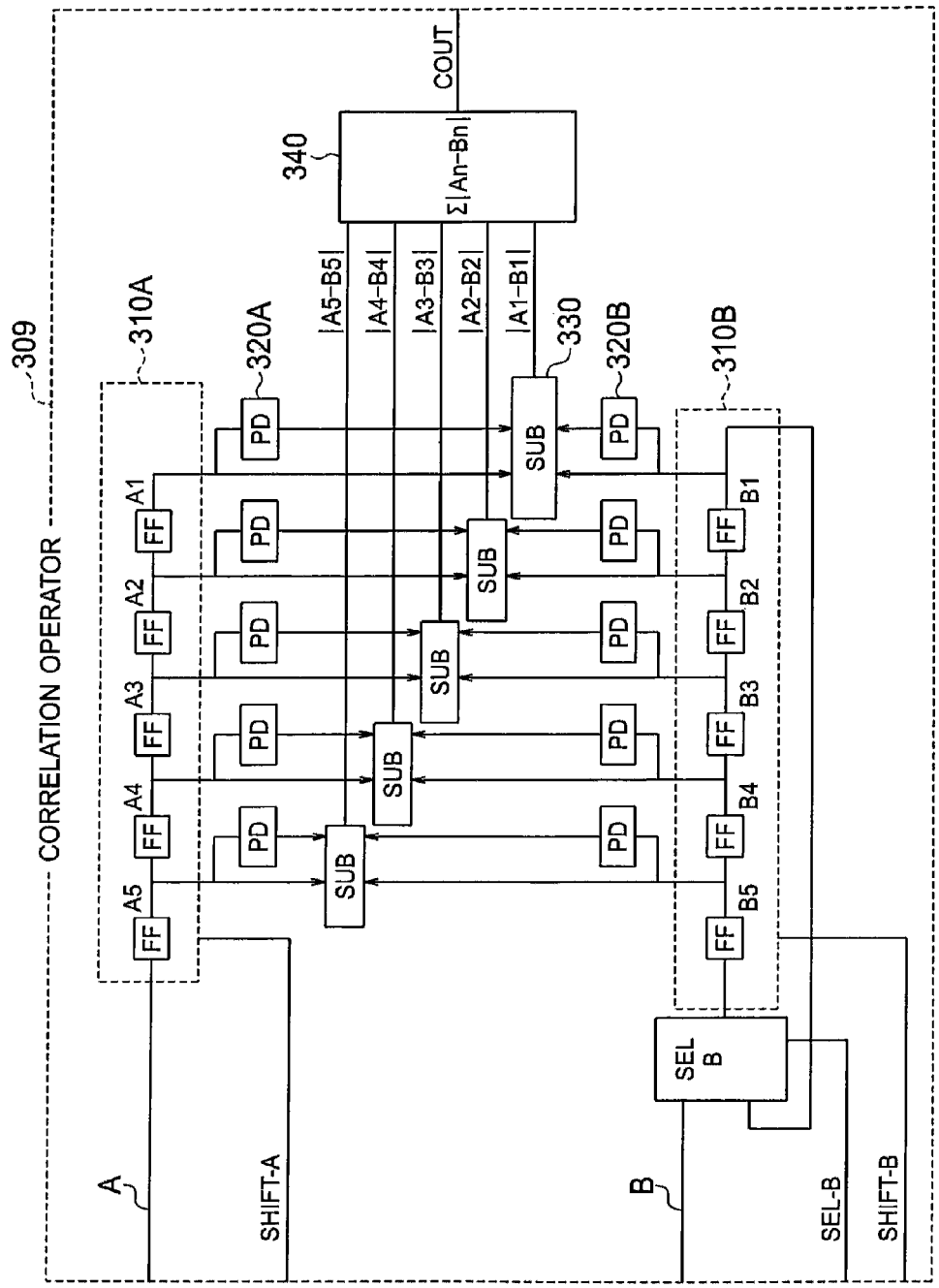
FIG. 12 is a diagram showing a structure of a correlation operator 309.

FIG. 12 shows a structure of the correlation operator 309.

A signal A from the focal-point detection pixel of the A-pupil and the command SHIFT-A for reading the signal A are input to a shift register 310A. Similarly, a signal B from the focal-point detection pixel of the B-pupil and the command SHIFT-B for reading the signal B are input to a shift register 310B.

An output from the shift register 310A and an output from the shift register 310B are input as they are, to a mask circuit 330.

Moreover, a part of the output from the shift register 310A is input to an isolated-point detecting section 320A. In the same manner, a part of the output from the shift register 310B is input to an isolated-point detecting section 320B.

Figure 13:
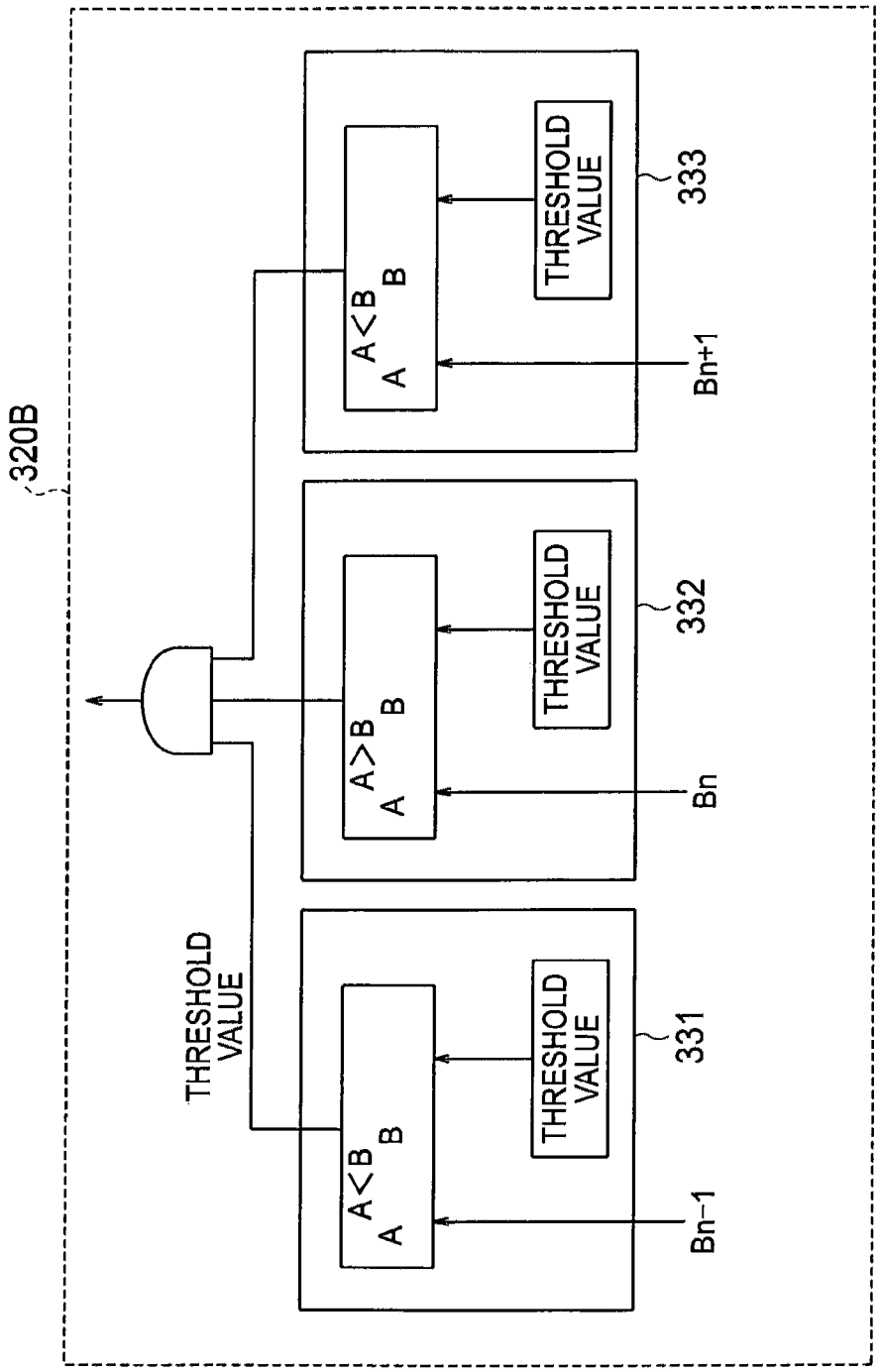
FIG. 13 is a diagram showing a structure of an isolated-point detecting section 320.

FIG. 13 shows a structure of the isolated-point detecting section 320B. Firstly, an 'isolated point' will be described below. For an isolated point, a case in which, an electric charge in a certain pixel overflows, and only a signal from the pixel having the overflow has an outstandingly large strength as compared to previous and subsequent pixels is to be assumed. In this case, the signal of this pixel having the overflow is called as an 'isolated point'. This is similar in a case in which, a signal from a certain focal-point detection pixel has outstandingly large strength due to an effect of the overflow in a surrounding pixel.

A structure of the isolated-point detecting section 320A being same as the structure of the isolated-point detecting section 320B, the description to be repeated will be omitted.

Each of the isolated-point detecting sections 320A and 320B has three comparison sections 331, 332, and 333 which are same. Moreover, in each of the comparison sections 331, 332, and 333, a signal Bn−1 and a threshold value, a signal B and a threshold value, and a signal Bn+1 and a threshold value are compared. Here, n is an integer. Bn denotes an nth signal B.

In other words, in the isolated-point detecting section 320B, when attention is focused on the signal B, the signals Bn−1 of the previous pixel and the signal Bn+1 of the subsequent pixel are also compared with threshold values respectively. Moreover, when the signal Bn−1 of the previous pixel and the signal Bn+1 of the subsequent pixel are smaller than the threshold value, and when only the signal B is larger than the threshold value, the signal B is judged to be an isolated point having an outstandingly large signal strength than the previous and the subsequent pixels.

An output from the isolated-point detecting section 320B and the output from the shift register 310B are input to the mask section 330. Moreover, an arrangement may be such that, the comparison is made with the threshold value by using an interpolated value which has been generated from the values of the signals Bn−1 and Bn+1 from the previous and the subsequent pixels.

Figure 14:
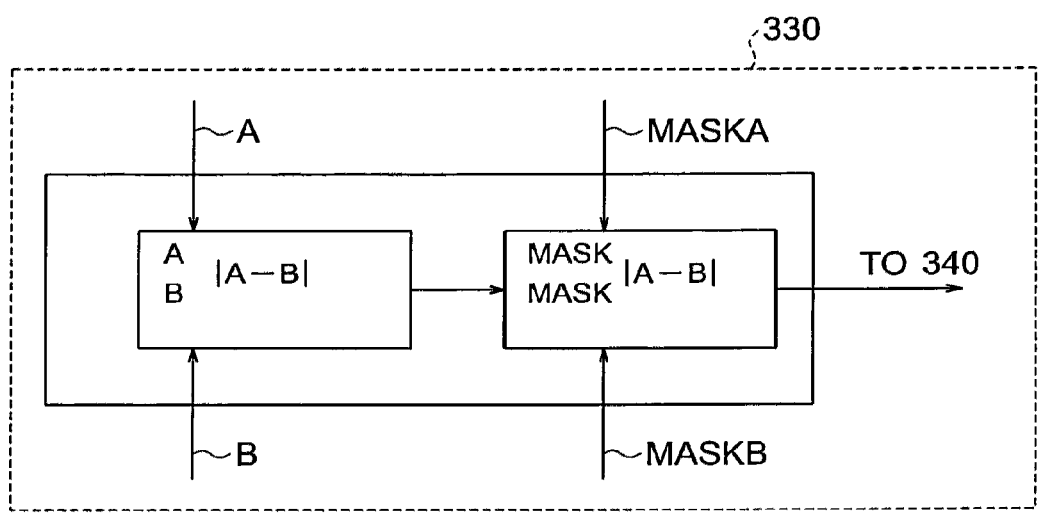
FIG. 14 is a diagram showing a structure of a mask portion 330.

FIG. 14 shows a structure of the mask section 330. The mask section 330 calculates a difference |A1−B1| between a signal A1 and a signal B1. Here, when a signal from at least one of the isolated-point detecting sections 320A and 320B is Hi (=1), the mask section 330 outputs zero.

Accordingly, when the electric charge has overflowed in the focal-point detection pixel, a signal from the focal-point detection pixel which has overflowed can be let to be zero.

A signal summing section 340 calculates a sum Σ|A−B| for all the focal-point detection pixels. The sum is equivalent to a so-called error area of a difference between the signal A and the signal B. Moreover, a point at which, the error area which is the sum becomes the minimum is calculated.

The description will be continued upon coming back to FIG. 9. A calculation result from the correlation operator 303 is input to the defocus-amount calculating circuit 304. The defocus-amount calculating circuit 304 calculates the amount of defocus. Moreover, based on a signal from the defocus-amount calculating circuit 304, the lens drive control section 16 drives the focusing lens 20 such that an object comes into focus.

Here, the correlation operator 304 has a function of the overflow judging section 24a (FIG. 1B). The overflow judging section 24a makes a judgment of whether or not at least one of the focal-point detection pixels has been affected by the overflow.

In this case, the 'judgment of whether or not affected by the overflow' means the following two cases (1) and (2).
(1) A case in which, when a strong light is incident on the focal-point detection pixel, the focal-point detection pixel is judged to have overflowed.
(2) A case in which, when a weak light is incident on the image-pickup pixel around the focal-point detection pixel, as a light leakage from the adjacent pixel, the focal-point detection pixel is judged to have overflowed.

In other words, the overflow judging section 24a makes a judgment of whether or not the focal-point detection pixel has overflowed, or makes a judgment of whether or not the focal-point detection pixel has been affected by the pixel around the focal-point detection pixel being overflowed.

As mentioned above, in a state of the focal-point detection pixel being overflowed, or in a state of being affected by the pixel around the focal-point detection pixel being overflowed, a signal from the overflowed focal-point detection pixel is let to be zero.

Accordingly, the image pickup apparatus according to the first embodiment has the overflow judging section which makes a judgment of whether or not the focal-point detection pixel has been affected by the overflow. Moreover, based on a judgment result, a signal of the focal-point detection pixel which has overflowed is not to be used for detecting the amount of defocus. As a result, it is possible to prevent degradation of a focal-point detection performance.

Moreover, a case in which, the image pickup element 22 is formed of a C-MOS will be described below. The first embodiment is not restricted to the case in which the image pickup element 22 is formed of the C-MOS, and the image pickup element 22 may be formed of a CCD.

In a case of using a CCD as the image pickup element 22, by controlling appropriately a voltage to be applied to each electrode, an electric charge of each element is transferred to an adjacent element, simultaneously for all the elements. Accordingly, an electric charge for each pixel held by each element is drawn to outside subsequently by bucket-brigade method.

In this case, signals for one row or signals for one column of an image pickup element including the focal-point detection pixel which has been affected by the overflow are affected by the overflow. Therefore, in the first embodiment, the signals for one row or signals for one column of the image pickup element including the focal-point detection pixel which has been affected by the overflow are not to be calculated for the focal-point detection.

Figure 15B:
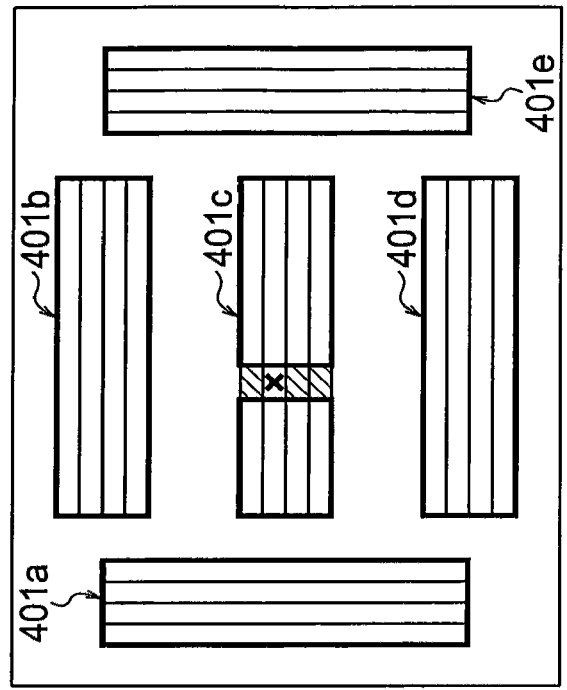
FIG. 15A and FIG. 15B are diagrams explaining a process when a focal-point detection pixel has been affected by an overflow.
Figure 15A:
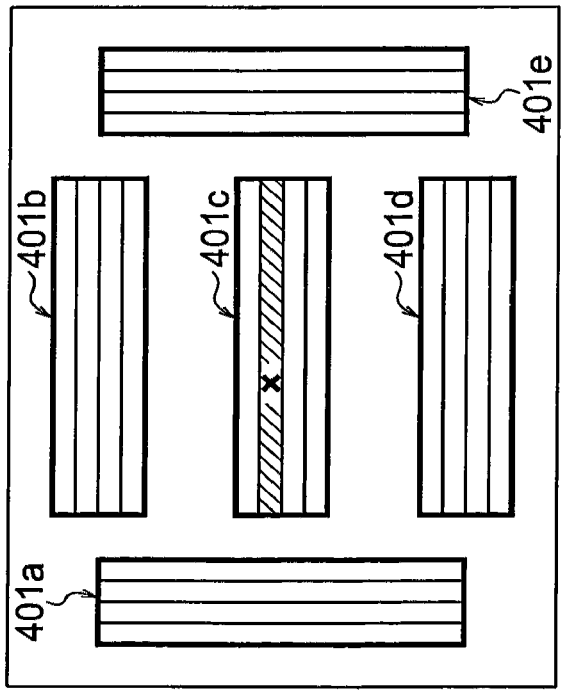

FIG. 15A and FIG. 15B are diagrams explaining a process when a focal-point detection pixel marked by x has been affected by an overflow, in an image pickup element 400 in which a CCD is used.

Firstly, in FIG. 15A and FIG. 15B, the image pickup element 400 has a plurality of areas for focal-point detection (hereinafter, 'focal-point detection areas') 401*a*, 401*b*, 401*c*, 401*d*, and 401*e*. Moreover, a state of the focal-point detection pixel marked by x being affected by overflow is let to be a state in which, there is an overflow in that particular focal-point detection pixel.

In this case, when the defocus-amount calculating circuit 304 calculates the amount of defocus, it is possible not to use signals from one row in a horizontal direction including the focal-point detection pixel in which there is an overflow, as shown in FIG. 15A.

Similarly, when the defocus-amount calculating circuit 304 calculates the amount of defocus, it is possible not to use signals from one column in vertical direction including the focal-point detection pixel in which there is an overflow, as shown in FIG. 15B.

(Second Embodiment)

Next, in an image pickup apparatus according to a second embodiment of the present invention, a photoelectric conversion area when seen from an optical axial direction of each pixel is shown.

Figure 16:
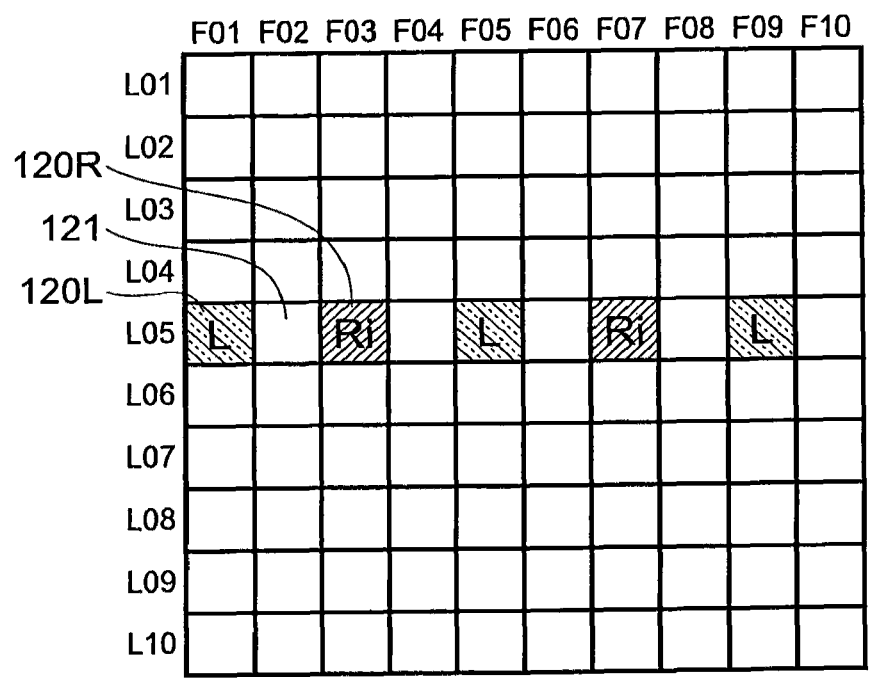
FIG. 16 is a plan view showing a structure of an image pickup element according to a second embodiment of the present invention.

In FIG. 16, an example of 10 vertical pixels (L01 to L10) and 10 horizontal pixels (F01 to F10), a total of 100 pixels is shown. However, the number of pixels is not restricted to 100, and it may be an example in which, the number of pixels is more than 10 million.

In the example shown in FIG. 16, directions in which the center of gravity of area of the photoelectric conversion area is shifted with respect to the pixel center are two directions namely, a rightward direction and a leftward direction. In the following description, the pixels will be called as a right pixel 120R and a left pixel 120L.

In FIG. 106, in a row of L05, the left pixel 120L, an image-pickup pixel 121, the right pixel 120R, and the image-pickup pixel 121 are disposed repeatedly in order from left (from F01).

In the example shown in FIG. 16, for instance, an arrangement is such that, for a pixel L05 F01 (left pixel 120L) and a pixel L05 F03 (right pixel 120R), a distance between centers of pupil of pixels or a distance between centers of gravity of the pixels is smaller than a distance between pixel centers which is to be calculated from a pixel pitch.

Moreover, when any of the focal-point detection pixels in FIG. 16 has overflowed, similarly as in the first embodiment, when a signal from that focal-point detection pixel is to be let to be zero, or a signal from that focal-point detection pixel is not to be used for calculating the amount of defocus.

As a result, it is possible to prevent degradation of focal-point detection performance.

(Third Embodiment)

Next, an image pickup element in an image pickup apparatus according to a third embodiment of the present invention will be described below. In the third embodiment, unlike in the first embodiment and the second embodiment, an arrangement is such that, color filters in FIG. 17 are disposed to overlap.

In the arrangement of color filters in FIG. 17, a pixel L01 F01 is let to be a filter G of green color and a pixel L01 F02 is let to be a filter R of red color, and this combination pattern is repeated in a horizontal direction.

Moreover, a pixel L02 F01 is let to be a filter B of blue color and a pixel L02 F02 is let to be a filter G of green color, and a pattern of a row L01 and a pattern of a row L2 are repeated in a vertical direction.

Here, a pixel L05 F01 and a pixel L05 F09 in which, filters G of green color are disposed are left-side pupil detection pixels. Moreover, a pixel L05 F05 is a right-side pupil detection pixel.

Accordingly, it is possible to carry out highly accurate focal-point detection irrespective of a color of the object. However, a combination of direction of shifting of the color filter and the photoelectric conversion area from the pixel center is not restricted to the abovementioned combination.

When any of the focal-point detection pixels in FIG. 17 has overflowed, similarly as in the first embodiment and the second embodiment, a signal from that focal-point detection pixel is to be let to be zero, or the signal from that focal-point detection pixel is not to be used for calculating the amount of defocus.

As a result, it is possible to prevent degradation of a focal-point detection performance.

(Fourth Embodiment)

Figure 18:
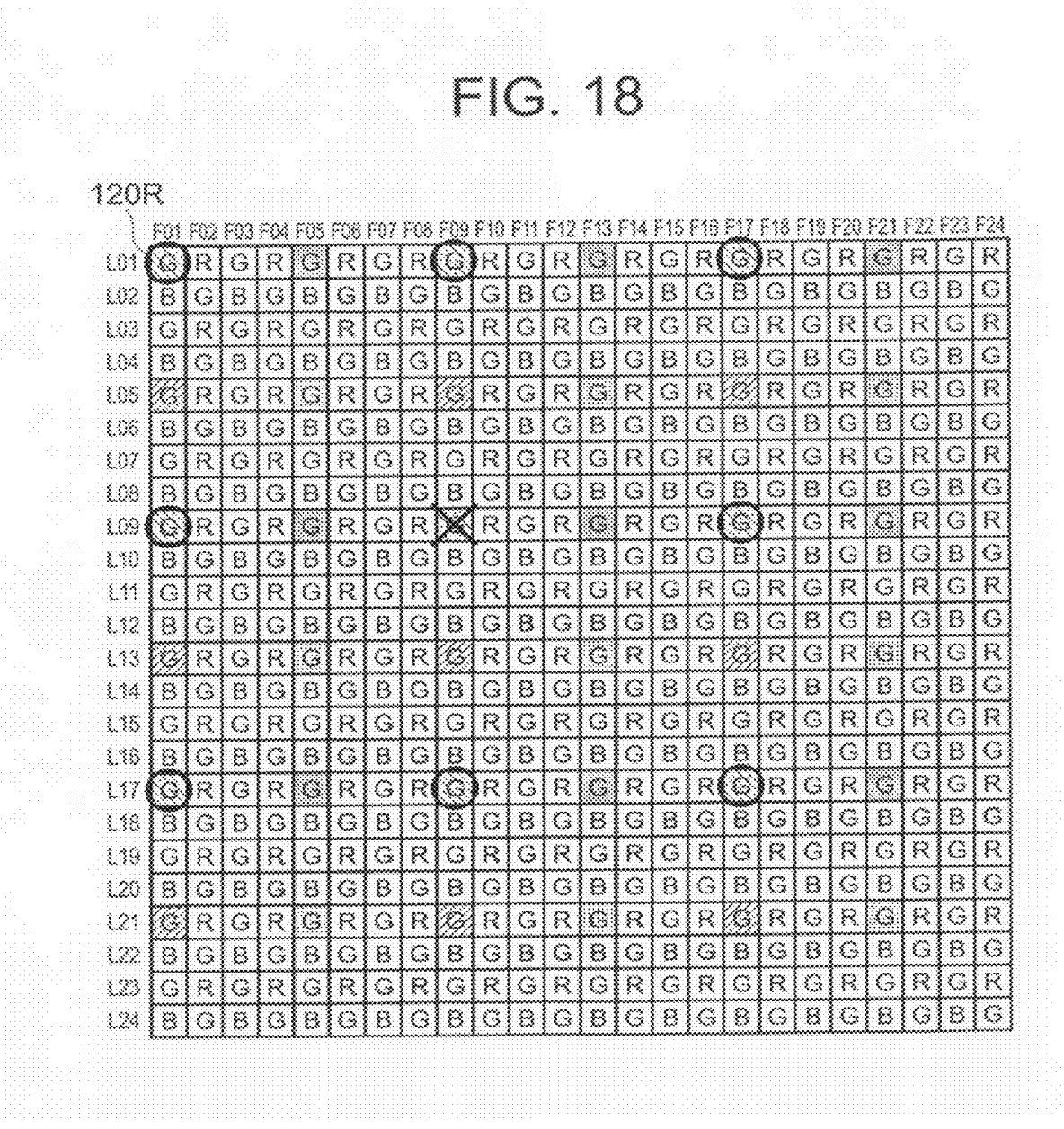

Next, an image pickup element in an image pickup apparatus according to a fourth embodiment of the present invention will be described below. The fourth embodiment, similarly as the third embodiment, has an arrangement in which, color filters are disposed to overlap as shown in FIG. 18.

Here, nine pixels for which filter G for green color are set in left-side pupil detection pixels are as follows.

L01 F01 (pixel surrounded by a O mark)
L01 F09 (pixel surrounded by a O mark)
L01 F17 (pixel surrounded by a O mark)
L09 F01 (pixel surrounded by a O mark)
L09 F09 (pixel marked by x)
L09 F17 (pixel surrounded by a O mark)
L17 F01 (pixel surrounded by a O mark)
L17 F09 (pixel surrounded by a O mark)
L17 F17 (pixel surrounded by a O mark)

When a state in which, there is an overflow in the pixel L09 F09 marked by x is let to be a state in which, the L09 F09 is affected by an overflow of a surrounding pixel, the following process is to be carried out.

Figure 19:
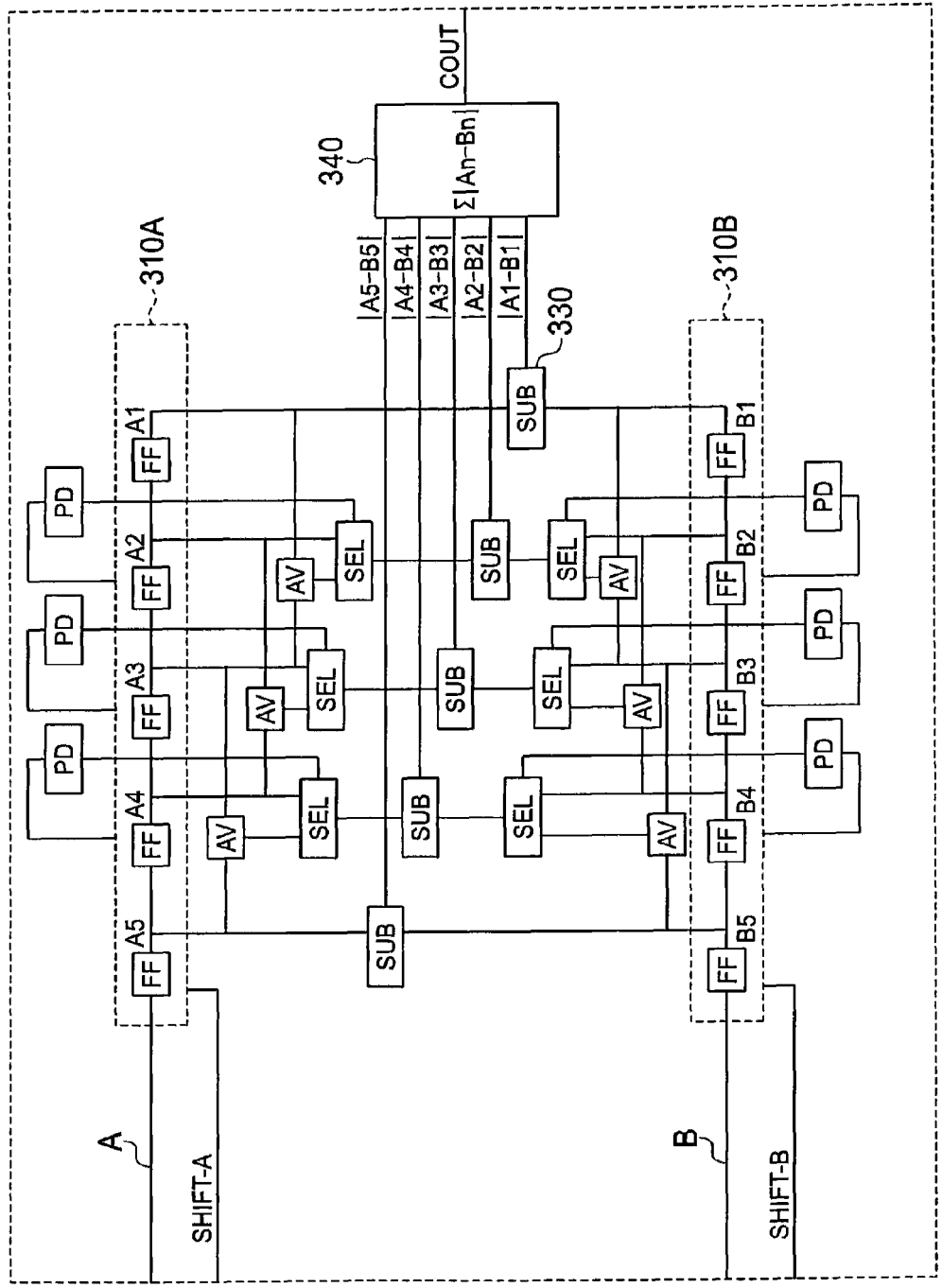
FIG. 19 is a diagram showing a structure of a correlation operator according to the fourth embodiment.

FIG. 19 is a functional block diagram of a structure for an overflow judgment and a process thereof according to the fourth embodiment. The description will be made by referring to FIG. 18 and FIG. 19.

When the overflow judging section 24*a* has made a judgment that the pixel L09 F09 which is at least one of the focal-point detection pixels is to be affected by an overflow, a signal from the focal-point detection pixel L09 F09 can be let to be not subjected to computing.

As a result, it is possible to prevent degradation of the focal-point detection performance.

Moreover, an arrangement may be such that signals from all the pixels in a row of L09 including the focal-point detection pixel L09 F09 can be let to be not subjected to computing.

As a result, it is possible to prevent degradation of the focal-point detection performance.

Moreover, in a state in which, a pixel around the focal-point detection pixel L09 F09 has overflowed, and the focal-point detection pixel L09 F09 is affected by the overflow, and in a state in which, the focal-point detection pixel L09 F09 has overflowed, the calculating section 24*b* is capable of detecting the amount of defocus based on a signal of the focal-point detection pixel other than the focal-point detection pixel L09 F09.

In the fourth embodiment, the amount of defocus is calculated by using a signal of a focal-point detection pixel which receives light from a pupil of the same type as L09 F09, as well as a focal-point detection pixel in which, a color filter of same color is disposed.

Concretely, the amount of defocus is calculated by using signals from eight focal-point detection pixels (marked by O) L01 F01, L01 F09, L01 F17, L09 F01, L09 F17, L17 F01, L17 F09, and L17 F17.

Concretely, for the focal-point detection pixels which are not to be used for computing focal-point detection, an interpolator circuit as mentioned above can interpolate data of address of the pixel L09 F09 by interpolation, based on signals from the eight focal-point detection pixels.

Accordingly, when there is an overflow in the focal-point detection pixel, a signal of the focal-point detection pixel having the overflow is not to be used for detecting the amount of defocus, and by detecting the amount of defocus based on a signal of the other focal-point detection pixel, it is possible to prevent degradation of focal-point detection performance.

Moreover, when the overflow judging section 24a has made a judgment that at least one of the focal-point detection pixels has an overflow, an arrangement may be made such that the calculating section 24b calculates the amount of defocus based on a signal from the image-pickup pixel. Accordingly, it is possible to prevent degradation of focal-point detection performance.

Moreover, when the overflow judging section 24a has made a judgment that there is an overflow in all the focal-point detection pixels of the photoelectric conversion portion, it is possible to make 'focal-point detection not possible' display on the liquid-crystal display element 26.

Furthermore, when the overflow judging section 24a has made a judgment that there is an overflow in all the focal-point detection pixels of the photoelectric conversion portion, an arrangement can be made such that focusing is carried out based on contrast of an image. Accordingly, it is possible to carry out focusing all the time.

As it has been described above, the image pickup apparatus according to the present invention is useful for an image pickup apparatus in which minimum degradation of image quality and a high focal-point detection performance are sought.

The present invention shows an effect that it is possible to provide an image pickup apparatus in which, focal-point detection is possible with high accuracy all the time.

What is claimed is:

1. An image pickup apparatus in which, a taking lens is installable or fixed, comprising:
an image pickup element in which, pixels are arranged two-dimensionally, wherein
the pixels include focal-point detection pixels each having a first photoelectric conversion portion, and image-pickup pixels each having a second photoelectric conversion portion,
the focal-point detection pixels are arranged to restrict a direction of incidence of a light beam which is incident upon the first photoelectric conversion portion,
the image-pickup pixels are arranged such that, the direction of incidence of the light beam which is incident upon the second photoelectric conversion portion is not restricted more than the direction of incidence restricted by the focal-point detection pixel,
the focal-point detection pixel outputs at least a signal for ranging,
the image-pickup pixel outputs at least a signal for an image, and
the image pickup apparatus comprising:
an overflow judging section which judges whether or not the first photoelectric conversion portion has overflowed, and judges whether or not the second photoelectric conversion portion has overflowed; and
a calculating section which calculates an amount of defocus based on a judgment result of the overflow judging section and the signal for ranging.

2. The image pickup apparatus according to claim 1, wherein when the overflow judging section has made a judgment that at least one of the focal-point detection pixels is affected by the overflow, the calculating section detects the amount of defocus based on a signal of the focal-point detection pixel other than the focal-point detection pixel which has been affected by the overflow.

3. The image pickup apparatus according to claim 2, wherein when the overflow judging section has made a judgment that at least one of the focal-point detection pixels has been overflowed, the calculating section carries out detection of the amount of defocus based on the signal of the focal-point detection pixel other than the focal-point detection pixel which has overflowed.

4. The image pickup apparatus according to claim 2, wherein when the overflow judging section has made a judgment that a pixel around the focal-point detection pixel has overflowed, and that the focal-point detection pixel has been affected, the calculating section carries out detection of the amount of defocus based on the signal of the focal-point detection pixel other than the focal-point detection pixel which has been affected by the overflow.

5. The image pickup apparatus according to claim 3, wherein the focal-point detection pixel which is not to be used for computing focal point detection is to be subjected to mathematical interpolation or pixel interpolation.

6. The image pickup apparatus according to claim 1, wherein when the overflow judging section has made a judgment that at least one of the focal-point detection pixels has been affected by the overflow, a signal from the focal-point detection pixel is not to be calculated.

7. The image pickup apparatus according to claim 1, wherein when the overflow judging section has made a judgment that at least one of the focal-point detection pixels has overflowed, the calculating section carries out focal point detection based on a signal from the image-pickup pixel.

8. The image pickup apparatus according to claim 1, comprising:
a display section, wherein
when the overflow judging section has made a judgment that there is an overflow in all the focal-point detection pixels of the first photoelectric conversion portion, the display section displays that the focal point detection is not possible.

9. The image pickup apparatus according to claim 1, comprising:
a lens drive control section, wherein
when the overflow judging section has made a judgment that there is an overflow in all the focal-point detection pixels of the first photoelectric conversion portion, the lens drive control section carries out focusing based on a contrast of an image.

* * * * *